United States Patent [19]

Leu

[11] Patent Number: 5,415,883

[45] Date of Patent: May 16, 1995

[54] METHOD FOR PREPARING PRE-COOKED MEAT

[75] Inventor: Romeo J.-P. Leu, Houston, Tex.

[73] Assignee: Minh Food Corporation, Pasadena, Tex.

[21] Appl. No.: 128,899

[22] Filed: Sep. 29, 1993

[51] Int. Cl.⁶ .................................................. A23L 1/314
[52] U.S. Cl. ...................................... 426/293; 426/92; 426/296; 426/641
[58] Field of Search .................. 426/92, 281, 293, 296, 426/641, 643, 644

[56] References Cited

U.S. PATENT DOCUMENTS

| | | | |
|---|---|---|---|
| 3,501,316 | 3/1970 | Guthrie | 426/644 X |
| 4,012,808 | 3/1977 | Strong | 426/644 X |
| 4,206,241 | 6/1980 | Eberhardt et al. | 426/296 X |
| 4,272,533 | 6/1981 | Bengtsson et al. | 426/241 |
| 4,317,842 | 3/1982 | El-Hag et al. | 426/302 |
| 4,363,823 | 12/1982 | Kimura et al. | 426/542 |
| 4,447,461 | 5/1984 | Loos et al. | 426/589 |
| 4,510,163 | 4/1985 | Gejl-Hansen | 426/241 |
| 4,640,837 | 2/1987 | Coleman et al. | 426/94 |
| 4,832,969 | 5/1989 | Lioutas | 426/270 |
| 4,927,650 | 5/1990 | Roberts | 426/295 |
| 4,940,590 | 7/1990 | Williams et al. | 426/92 |
| 4,946,693 | 8/1990 | Rinsler et al. | 426/243 |
| 5,004,616 | 4/1991 | Shanbhag et al. | 426/102 |
| 5,004,618 | 4/1991 | Buckholz, Jr. et al. | 426/281 |
| 5,262,185 | 11/1993 | Babka et al. | 426/296 X |

FOREIGN PATENT DOCUMENTS 62-3771  1/1987  Japan .................................. 426/296

OTHER PUBLICATIONS

Skidmore Sales & Distributing Company, Inc. Sales Brochure entitled *Skidmore Flavor Stabilizer-O* ™.

*Primary Examiner*—Arthur L. Corbin
*Attorney, Agent, or Firm*—Merchant, Gould, Smith, Edell, Welter & Schmidt

[57] ABSTRACT

Pre-cooked meats including poultry, seafood and red meats are disclosed which can be prepared by coating a meat with a liquid and dry marinade, cooking the coated meat at a temperature of about 240° F. to 260° F. and freezing the coated meat after the cooking step. The pre-cooked meat of the invention may also comprise additional additives and spices. The invention is directed to pre-cooked meat products, method of preparation and food products containing the pre-cooked meat.

13 Claims, No Drawings

METHOD FOR PREPARING PRE-COOKED MEAT

FIELD OF THE INVENTION

The invention relates generally to pre-cooked meat products and methods of producing the same. More specifically, the invention is directed to pre-cooked meat products including red meats, seafood and poultry and methods of low temperature preparation of these products.

BACKGROUND OF THE INVENTION

Pre-cooked foods are well known. Pre-cooked meats have been developed for several different types of meat including chicken, beef, and pork.

Kimura, et al., U.S. Pat. No. 4,363,823, disclose the use of a natural anti-oxidant derived from herbs, and is directed to the process of producing herb derivative anti-oxidants. This reference discloses incorporating the herb derivative at 0.001 to 0.2 wt- % of a frying oil and frying a food product such as a meat at 100° to 280° C. (212° to 536° F.).

Roberts, U.S. Pat. No. 4,927,650, discloses meats which are coated with additional dry particulate ingredients such as flavorants and thickeners. This reference teaches pre-cooking a divided food such as meat in a cubed form, coating the pre-cooked meat with additional dry ingredients and freezing the coated meat product in a divided state.

Williams et al., U.S. Pat. No. 4,940,590, disclose microwaveable foods such as a poultry which are marinaded in a liquid solution, tumbled with spices and other coatings, cooked, e.g. baking for 6 to 25 minutes at 475° F. in a dry heat oven, followed by freezing to produce a microwaveable food product. Flavored food products such as oriental teriyaki are also disclosed.

Dry marinades are used as thickeners or batters in most oriental recipes. Examples of dry marinades are listed as follows:

Example 1

Deep fried shrimp with vegetables
1 egg
¾ cup water
2 T. sugar
1 C. flour or cornstarch
¼ tsp. salt

Example 2

Shrimp with bean curd
1½ T. cornstarch
2 T. water
½ T. sesame oil

Example 3

Beef & Broccoli
1 ½ tsp. potato or corn starch
1 T. water

Buckholz, Jr., et al., U.S. Pat. No. 5,004,618, disclose a marinaded meat product which is frozen for later reheating or reconstitution. The meat is coated with a mixture of an inorganic phosphate salt, water and reaction product flavorant. The reaction product flavorant is intended to "cover" the warmed over flavor of reheated meats. After the marination of meats in this composition, the product is cooked, e.g. at 380° F. in an oven or is subjected to microwave radiation to pre-cooked the product before it is blast frozen.

However, there is a need to develop pre-cooked meat products with increased yields having less moisture loss, better eating products in terms of texture, juiciness and taste and higher eating quality after reconstitution or reheating in a microwave oven, conventional oven, convection oven, wok, griddle or other cooking equipment. This is particularly true for maintaining the delicate flavor of stir fry meats, seafood and poultry.

Stir fry products are a popular retail item. These "kits" essentially consist of a meat item, selected vegetables and a sauce/flavoring packet. These three main ingredients may be packaged individually in a modified atmosphere barrier package (MAP) to exclude oxygen from entering the product. In these kits, the meat component is generally cooked in water first, then diced into bite size pieces which results in a finished product that is very coarse in texture, tough (chewy), dry and crumbly, has an old, oxidized, warmed over flavor, and shows freezer burn (dehydration of cooked meat pieces on the surface). Commercial pre-cooked meat products generally suffer from poor eating quality in terms of juiciness, texture and flavor. Further, these known pre-cooked meat products have a poor appearance and high juice loss (low yield). Thus, a substantial need exist for a pre-cooked stir fry meat product with improved yield, texture and flavor, and methods for providing the same.

SUMMARY OF THE INVENTION

In accordance with a first aspect of the invention there is provided a low temperature method of preparing a pre-cooked meat including the steps of coating a meat with a liquid marinade in an initial coating, coating the meat with a dry marinade, including a farinaceous material and salt, in a second coating to give a coated meat, cooking the coated meat at a temperature of about 240° F. to 260° F. and freezing the coated meat after the cooking step. The present invention is also directed to a pre-cooked meat according to the method of preparation of the invention, and a food product comprising a pre-cooked meat.

In accordance with a preferred aspect of the invention there is provided a low temperature preparation of pre-cooked meat including the steps of coating a meat in a vacuum tumbler for about 20 to 40 seconds with a liquid marinade, including wine and soy sauce, in an initial coating step where the ratio of weight of said wine to soy sauce is between about 1:3 and 1:1, coating the meat in a vacuum tumbler for about 20 to 40 seconds with a dry marinade including about 20 to 60% of a farinaceous material and about 40 to 80% of a salt in a second coating to give a coated meat, frying the coated meat in a vegetable oil at a temperature of about 240° F. to 260° F. until the internal temperature of the coated meat is at least about 148° F. for red meats and seafood products and about 160° F. for poultry and immediately freezing the coated meat after the frying wherein the salt, comprises of the total salt about to 20 to 90% of an encapsulated salt by weight.

The invention is also directed to a pre-cooked meat product including a meat and a marinade coating wherein the cooked meat product is prepared according to the steps including coating a meat with a liquid marinade in an initial coating, coating the meat with a dry marinade, including a farinaceous material and a salt, in a second coating to a give a coated meat, cooking the coated meat at a temperature of about 240° F. to 260° F. and freezing the coated meat after the cooking step.

The invention provides an improved pre-cooked meat product. The pre-cooked meat product has improved eating quality in terms of juiciness, texture and flavor. Additionally, the production yield is at least about 87% due to the very low juice loss for all their reconstituting methods. Finally, reconstituting the cooked, frozen stir fry product by use of a microwave, convection or conventional oven, wok or griddle results in a superior product, compared to other stir fry products in the marketplace.

DETAILED DESCRIPTION OF THE INVENTION

The invention is directed to methods of preparation and compositions of a pre-cooked meat product including a meat and a marinade coating wherein the pre-cooked meat product is prepared according to the steps including coating a meat with a liquid marinade in an initial coating, coating the meat with a dry marinade, including a farinaceous material and a salt, in a second coating to give a coated meat, cooking the coated meat at a temperature at about 240° F. to 260° F. and freezing the coated meat after the cooking step.

The present invention is also directed to the preparation of a food product comprising the pre-cooked meat of the present invention. Examples of typical food products utilizing the pre-cooked meat of the present invention include microwaveable dinners, stir fry, tv dinners and other packaged refrigerated entrees.

A. Meat

The invention is directed to a pre-cooked meat product. Generally, the meat products of the invention comprise beef, pork, veal, poultry and seafood. In a preferred aspect, the invention is directed to beef, pork, shrimp and chicken.

Generally, the size of the meat product is not critical. The meat particle size can vary from bite size to a whole chicken breast. Preferably bite size meat pieces are utilized in the present invention. More preferably, the meat pieces have a uniform size in order to give a uniform degree of cooking and yield. More preferably, the size of the poultry pieces are about 1¼ to 1⅜ inches in length ⅜ inch to ⅝ inch in width and the natural thickness of a chicken breast; for pork and beef the size is preferably about 1¼ inch to 2 inches in length, about ⅞ inch to 1¼ inch in width and about ⅛ to ¼ in thickness; and individual pieces for shrimp.

B. Liquid Marinade

The composition of the invention comprises a liquid marinade which forms a protective protein layer on the surface of the meat particle and achieves the appropriate flavor profile. The flavor profile can be selected from the group consisting of oriental stir fry, teriyaki, hot pepper mexican flavoring, indonesian curry flavoring, lobster newburger, lemon, italian, and garlic. Preferably, the flavor profile of the invention is an oriental stir fry. More preferably, the liquid marinade comprises wine and a soy sauce to give an oriental stir fry flavor profile.

EXAMPLES

Liquid Marinade #1 (to be used with chicken)
¾ cup soy sauce
¼ cup sugar
¼ cup dry sherry or white rice wine
2 teaspoons grated fresh ginger root
1 small clove garlic, crushed Liquid Marinade #2 (to be used with lamb or venison)
½ cup dry red wine
¼ cup vinegar
¼ cup olive oil
2 or 4 juniper berries
A sprig of parsley
A sprig of thyme
2 bay leaves
1 crushed clove garlic
2 slices onion
A pinch of nutmeg
1 tablespoon sugar
1 teaspoon salt
A dash of hot pepper sauce Liquid Marinade #3 (to be used with venison)
Cover venison with:
1 cup water
Add:
1 cup dry red wine
6 or 8 black peppercorns
1 bay leaf
10 to 12 whole cloves
1 sliced onion
1 small sprig rosemary Liquid Marinade #4 (to be used with steak)
Combine:
1 cup soy sauce
¾ cup brown sugar
1 tablespoon ground ginger Liquid Marinade #5 (to be used with beef)
Combine:
1½ cups beer
½ cup salad oil
1 clove garlic
2 tablespoons lemon juice
1 tablespoon sugar
1 teaspoon salt
3 cloves of garlic Liquid Marinade #6 (to be used with pork)
Combine:
3 tablespoons chili sauce
1½ tablespoons lemon juice
1 tablespoon grated onion
¼ teaspoon dry mustard
2 teaspoons Worcestershire sauce
½ teaspoon salt
¼ teaspoon paprika Liquid Marinade #7 (to be used with chicken)
Combine:
¼ cup salad oil
½ cup dry white wine
1 minced clove garlic
1 finely chopped medium onion
½ teaspoon celery salt
½ teaspoon salt
¼ teaspoon coarsely ground black pepper
¼ teaspoon dried thyme, tarragon or rosemary Liquid Marinade #8 (to be used with fish or shrimp)
Combine:
¼ cup salad oil
3 crushed cloves garlic
2 teaspoons salt
¼ teaspoon black pepper
¼ teaspoon ginger or paprika
2 tablespoons lemon juice Liquid Marinade #9 (to be used with fish)
Combine:

¼ cup soy sauce
¼ cup sherry
¼ cup oil
1 crushed clove garlic

In a preferred embodiment, the ratio of weight of said wine to soy sauce is between about 1:3 and 1:1. More preferably, the liquid marinade comprises about 1 to 2% by weight of the pre-cooked meat of a cooking wine and about 2 to 3% by weight soy sauce based on the weight of the finished product. Most preferably, the liquid marinade comprises about 1.5% cooking wine and about 2.5% soy sauce based on the weight of the pre-cooked meat.

Preferably, the liquid marinade is coated onto the meat by use of a vacuum tumbler. In the vacuum tumbler, the meat is rotated out of the liquid marinade and allowed to fall through the reduced pressure atmosphere so that the whole surface of the meat is exposed to vacuum before reintroduction into the liquid marinade. This takes place over several cycles. Importantly, the vacuum tumbler rotation is slow enough that the meat is not held by centrifugal force against the outer wall, but is pulled off by gravity as it nears the top of the travel path within the vacuum tumbler. The liquid marinade is absorbed into the meat, leaving the meat surface sticky with myosin protein generated during the vacuum tumbling. The liquid marinating process, as taught by U.S. Pat. No. 4,038,426, results in coating the meat with a congealed layer of viscous protein. Thus, a preferred moist adhesive coating on the meat is produced so that the dry marinade may be uniformly coated over the entire meat surface and adsorbed onto the surface layer of the meat.

The vacuum tumbler is only partially filled with liquid marinade to leave an air space there above, which is evacuated to a pressure below atmospheric pressure when the drum is rotated to marinade a batch of the meat product. The internal vacuum pressure is important because the meat initially contains air in the capillaries and tissues which can block the quick entry of the liquid marinade into the meat. Generally, a vacuum pressure of about 20 to 28 inches of Hg is maintained in the vacuum tumbler when the marinading is taking place. More preferably, a vacuum pressure of about 26 to 28 inches of Hg is maintained.

In a preferred embodiment, the meat product is tumbled in the vacuum tumbler for about to 10 to 50 seconds. More preferably, the meat product is tumbled in the vacuum tumbler containing the liquid marinade for about 20 to 40 seconds. Most preferably, the meat is tumbled in the vacuum tumbler containing the liquid marinade for about 30 seconds. These lengths of marinading time are adequate to allow the meat to absorb the liquid marinade. Longer times will cause the salt from the liquid marinade to extract more protein from the meat giving a stickier product which is not desirable.

C. Dry Marinade

The dry marinade of the invention comprises a farinaceous material and salt. Optional ingredients further comprise sodium phosphates, spices, and natural antioxidants. The farinaceous material is used to coat the meat and help retain the moisture in the meat. Generally, the farinaceous material comprises a starch or flour. Preferably, the farinaceous material comprises a rice flour.

In a preferred embodiment, the dry marinade comprises about 20 to 60% by weight of the farinaceous material. More preferably, the dry marinade comprises about 40 to 50% by weight of the farinaceous material.

In a preferred embodiment, the salt comprises an encapsulated salt. An encapsulated salt gives a salty taste without extracting an extensive amount of protein from the meat and the encapsulated salt granules help in separating the pieces of meat. Reducing the stickiness of the meat will prevent the meat from agglomerating together, and give the meat a more uniform coating.

In a preferred embodiment, the salt comprises about 20 to 90% of an encapsulated salt by weight of the total salt. More preferably, the total salt comprises about 50 to 70% of an encapsulated salt by weight.

Alkali metal phosphates such as sodium tripolyphosphate, sodium hexametaphosphate, sodium pyrophosphate and dipotassium phosphate, can be used in the dry marinade. These phosphates can be sodium, calcium or potassium salts. Preferably, the sodium salt is used alone or in combination with other phosphates to achieve the desired effect of moisture retention, improved firmness (texture) and reduced purge in the packaged product.

Preferably the sodium phosphate comprises about 0.3 to 0.5% by weight of the finished cooked stir fry product and the natural antioxidant mix comprises about 0.1 to 0.2% by weight of the cooked product.

Current stir fry products may contain chemical antioxidants like BHA, BHT and propyl gallate. These chemical antioxidants have to be labeled on the cooked stir fry product. A mix manufactured by Skidmore Sales of Cincinnati, Ohio can be used as a natural antioxidant. The mix consists essentially of extracts of spice, herbs, or leaves (i.e. tea) with a suitable carrier, chelating agent and anti-caking agent.

After the liquid marinade has been coated onto the meat product, in a second step the meat product is coated with the dry marinade. Preferably, the dry marinade is coated to form a uniform dry marinade coating on the meat. More preferably, the meat is coated with the dry marinade in a vacuum tumbler for about 20 to 40 seconds. Most preferably, the meat product is coated with the dry marinade in a vacuum tumbler for about 30 seconds. The vacuum tumbler is rotated at such a rate that the meat is not held against the vacuum tumbler by centrifugal force. Additionally, a partial vacuum is maintained during the second coating step. The operation parameters of the vacuum tumbler are similar to the operation parameters utilized when coating the meat with the liquid marinade. Upon completion of the dry marinade coating step, a coated meat is formed.

TABLE 1

| | % Wt of Pre-Cooked Meat Product | | | |
| --- | --- | --- | --- | --- |
| | | (% by weight of product) | | |
| | | Useful | Working | Preferred |
| Liquid Marinade | | 0–8 | 2–6 | 4–5 |
| Soy Sauce | 64.71% | | | |
| Cooking Wine | 35.29% | | | |
| | 100.00% | | | |
| Dry Marinade | | 0–6 | 2–5 | 3–4 |
| Sodium Phosphate | 10.67% | | | |
| Encapsulated Salt | 9.33% | | | |
| Regular Salt | 6.67% | | | |
| Sugar | 13.33% | | | |
| Garlic Powder | 5.33% | | | |
| Rice Flour | 48.00% | | | |
| Natural Antioxidant | 6.67% | | | |
| | 100.00% | | | |

D. Cooking

In a further step, the coated meat is cooked to form a cooked meat. The cooking sufficiently raises the temperature of the cooked meat to make it safe to eat, seal in the juice and improve the eating qualities e.g., taste and texture of the meat. Generally, the coated meat is cooked at a temperature of about 240° F. to 260° F. for a sufficient amount of time to kill any harmful bacteria. More preferably, the coated meat product is cooked at a temperature of about 240° F. to 255° F., most preferably about 240° F. to 250° F. In a preferred embodiment, the coated meat is cooked until the internal temperature of the coated meat reaches at least 148° F. for red meats and seafood products and at least 160° F. for poultry products. Preferably, the coated meat product is cooked at 240° F. to 250° F. for about 1½ to 2 minutes.

Generally, the coated meat is cooked by any heating method such as baking, frying, microwaving, grilling, steaming, boiling, etc. In a preferred embodiment of the invention, the coated meat product is cooked by frying the coated meat in an oil. More preferably, the oil is a vegetable oil. The vegetable oil can be selected from the group consisting of soy bean oil, cotton seed oil, palm kernel oil, safflower oil or corn oil.

E. Freezing

Following the cooking step, the cooked meat is frozen. Preferably, the cooked meat is frozen within one hour after the cooking step. More preferably, the cooked meat product is frozen within about 40 to 50 minutes after the cooking step.

In a preferred embodiment, the freezing is initiated immediately after the cooking step. More preferably, the cooked meat is individually quick frozen (IQF) immediately after the cooking step to prevent moisture loss from the cooked meat due to slow freezing, prevent freezer burn (dehydration of the surface) and keep the individual pieces distinct and separate from each other. The IQF is preferably accomplished by the use of a $CO_2$ or ammonia continuous system.

In order to extend the shelf life of the pre-cooked meat, the frozen meat product is either vacuum packaged or packaged in a modified atmosphere i.e., to remove oxygen and flush with inert gas (nitrogen/$CO_2$) and then hermetically sealed. Vacuum or MAP packaging the frozen meat provides an oxygen and moisture film barrier.

F. Working Examples

The following working examples serve to illustrate, but not limit the composition and method of this invention.

Working Example 1

| Stir-Fry Chicken | | |
|---|---|---|
| | Working | Preferred |
| Chicken | 94.7-85.8% | 92.4% |
| Liquid Marinade: | | |
| Soy Sauce Liquid | 2-4% | 2.5% |
| Cooking Wine | 1-2% | 1.5% |
| Dry Marinade: | | |
| Sodium Tripolyphosphate | 0.3-0.5% | 0.4% |
| Salt | 0.2-0.5% | 0.25% |
| Sugar | 0.5-1% | 0.5% |
| Garlic Powder | 0.1-0.5% | 0.2% |
| Antioxidant | 0.1-0.2% | 0.15% |
| Rice Flour | 1-5% | 1.8% |
| Encapsulated Salt | 0.1-0.5% | 0.3% |

Working Example 2

| Stir-Fry Beef or Pork | | |
|---|---|---|
| | Working | Preferred |
| Beef or Pork | 94.55-84.1% | 91% |
| Liquid Marinade: | | |
| Soy Sauce Liquid | 2-5% | 3.5% |
| Cooking Wine | 1-2% | 1.5% |
| Dry Marinade: | | |
| Sodium Tripolyphosphate | 0.3-0.5% | 0.4% |
| Salt | 0.2-0.5% | 0.25% |
| Sugar | 0.5-1% | 0.5% |
| Garlic Powder | 0.1-0.5% | 0.2% |
| Ground Ginger | 0.05-0.3% | 0.2% |
| Antioxidant | 0.1-0.2% | 0.15% |
| Black Pepper | 0.1-0.4% | 0.2% |
| Rice Flour | 1-5% | 1.8% |
| Encapsulated Salt | 0.1-0.5% | 0.3% |

Working Example 3

| Stir-Fry Shrimp or Scallop | | |
|---|---|---|
| | Working | Preferred |
| Shrimp or Scallop | 94.6%-84.4% | 92.55% |
| Liquid Marinade: | | |
| Soy Sauce Liquid | 2-5% | 2% |
| Cooking Wine | 1-2% | 1.5% |
| Dry Marinade: | | |
| Sodium Tripolyphosphate | 0.3-0.5% | 0.4% |
| Salt | 0.2-0.5% | 0.35% |
| Sugar | 0.5-1% | 0.6% |
| Garlic Powder | 0.1-0.5% | 0.2% |
| Antioxidant | 0.1-0.2% | 0.15% |
| White Pepper | 0.1-0.4% | 0.15% |
| Rice Flour | 1-5% | 1.8% |
| Encapsulated Salt | 0.1%-0.5% | 0.3% |

Production Yield

Product samples were prepared by following the above Working Examples 1-3. The meat was diced to a specified piece size, and then marinated with the liquid marinade for 30 seconds at approximately 15 to 20 rpm. Dry marinade was then added to the tumbler and the meat vacuum tumbled for 30 seconds at approximately 30 rpm. About 30 seconds elapsed between the tumbling of liquid and dry marinades.

The marinaded meat pieces were then fried in an institutional fryer for about 1 minute 45 seconds to obtain an internal temperature of about 148° F. for red meats and seafood, and 162° F. for poultry products. The oil temperature was maintained at about 240° F. or higher but the temperature did not exceed 255° F. The temperature of the oil was monitored with about 3° to 4° F. of fluctuation. The meat pieces were agitated to allow even cooking and prevent the meat pieces from sticking to each other while frying.

The production yield was obtained by comparing the weight of the cooked meat from the weight of the raw meat before frying. Production yields were obtained with values of about 87 to 92% yield.

The cooked meat is then immediately IQF by placing the meat pieces on trays and freezing them overnight. The pre-cooked meat is then packaged and stored in a freezer.

While the invention has been specifically described by reference to various embodiments, it will be recognized that various modifications, adaptions and variations, may be made without departing from the spirit and scope of the invention as defined by the following claims:

We claim:

1. A low temperature method of preparing a precooked meat consisting essentially of:
   a. coating a meat with a liquid marinade in an initial coating;
   b. coating the meat with a dry marinade comprising:
      i) a farinaceous material and
      ii) salt in a second coating to give a coated meat;
   c. cooking the coated meat at a temperature of about 240° F. to 260° F. until the internal temperature of the coated meat is at least about 148° F.; and
   d. freezing the coated meat after the cooking step.

2. The low temperature method of claim 1 further including vacuum packaging the coated meat after the freezing step.

3. The low temperature method of claim 1 wherein the liquid marinade comprises:
   a. wine and
   b. a soy sauce wherein the weight ratio of said wine to soy sauce is between about 1:3 to 1:1.

4. The low temperature method of claim 1 wherein the meat is coated with the liquid marinade in a vacuum tumbler.

5. The low temperature method of claim 4 wherein the meat is coated with the liquid marinade in the vacuum tumbler for about 20 to 40 seconds.

6. The low temperature method of claim 1 wherein the meat is coated with an effective protein extracting amount of the liquid marinade to form a protein layer on the surface of the meat.

7. The low temperature method of claim 1 wherein the meat is coated with the dry marinade in a vacuum tumbler.

8. The low temperature method of claim 7 wherein the meat is coated with the dry marinade in the vacuum tumbler for about 20 to 40 seconds.

9. The low temperature method of claim 1 wherein the coated meat is cooked by frying the coated meat in a vegetable oil.

10. The low temperature method of claim 1 wherein the cooking is performed at a temperature of about 240° to 225° F.

11. The low temperature method of claim 1 wherein the coated meat is individually quick frozen immediately after the cooking.

12. A low temperature method of preparing a precooked meat consisting essentially of:
   a. coating a meat in a vacuum tumbler for about 20 to 40 seconds with a liquid marinade comprising:
      i) wine and
      ii) a soy sauce in an initial coating step wherein the ratio of weight of said wine to said soy sauce is between about 1:3 and 1:1;
   b. coating the meat in a vacuum tumbler for about 20 to 40 seconds with a dry marinade comprising:
      i) about 20 to 60% of a farinaceous material and
      ii) about 40 to 80% of a salt in a second coating to give a coated meat;
   c. frying the coated meat in vegetable oil at a temperature of about 240° F. to 260° F. until the internal temperature of the coated meat is at least about 148° F.; and
   d. immediately freezing the coated meat after the frying, wherein the salt comprises about 20 to 90% of an encapsulated salt by weight.

13. The low temperature method of claim 12 wherein the frying is performed at about 240° to 250° F.

* * * * *

UNITED STATES PATENT AND TRADEMARK OFFICE
CERTIFICATE OF CORRECTION

PATENT NO. : 5,415,883
DATED : May 16, 1995
INVENTOR(S) : Romeo J. P. Leu

It is certified that error appears in the above-indentified patent and that said Letters Patent is hereby corrected as shown below:

On column 2, lines 1 and 2, please delete "to pre-cooked the product" and substitute therefore --to pre-cook the product--

On column 2, line 26, please delete "exist" and substitute therefore --exists--

On column 5, line 47, please delete "to" after the word "about"

On column 10, line 12 (claim 10), please delete "225" and substitute therefore --255--

Signed and Sealed this

Twenty-sixth Day of September, 1995

Attest:

BRUCE LEHMAN

Attesting Officer    Commissioner of Patents and Trademarks